United States Patent [19]
Milan

[11] 3,993,996
[45] Nov. 23, 1976

[54] SYSTEM FOR MEASURING PULSE INSTABILITIES IN A RADAR SYSTEM OR THE LIKE

[75] Inventor: John M. Milan, Los Angeles, Calif.

[73] Assignee: International Telephone and Telegraph Corporation, New York, N.Y.

[22] Filed: Sept. 10, 1975

[21] Appl. No.: 611,996

[52] U.S. Cl. .............................. 343/17.7; 343/7.7
[51] Int. Cl.² ........................................ G01S 7/40
[58] Field of Search ...................... 343/17.7, 7.7

[56] References Cited
UNITED STATES PATENTS

| | | | |
|---|---|---|---|
| 2,877,414 | 3/1959 | Pope, Jr. | 343/17.7 |
| 3,950,750 | 4/1976 | Churchill et al. | 343/17.7 |

Primary Examiner—Maynard R. Wilbur
Assistant Examiner—Richard E. Berger
Attorney, Agent, or Firm—William T. O'Neil

[57] ABSTRACT

A system for quantitative measurement of pulse circuit stability parameters, such as pulse time, amplitude and duration, and frequency or phase of an RF source. The device is a video instrument and the input pulse is ordinarily a demodulated RF pulse from a system to be evaluated, and includes an analog conditioning section and a digital processing section allowing for an analog indication of RMS "jitter." Means are provided for sampling and converting all parameter variations to amplitude variations and for quantizing them to digital form. Digital signal processing such as FFT, MTI Cancelling circuits, etc., are provided, after which there is digital-to-analog conversion and RMS detection and indication. Thus the measurement effected may be thought of as based on the MTI residue resulting from transmitter pulse instabilities of the type aforementioned.

10 Claims, 7 Drawing Figures

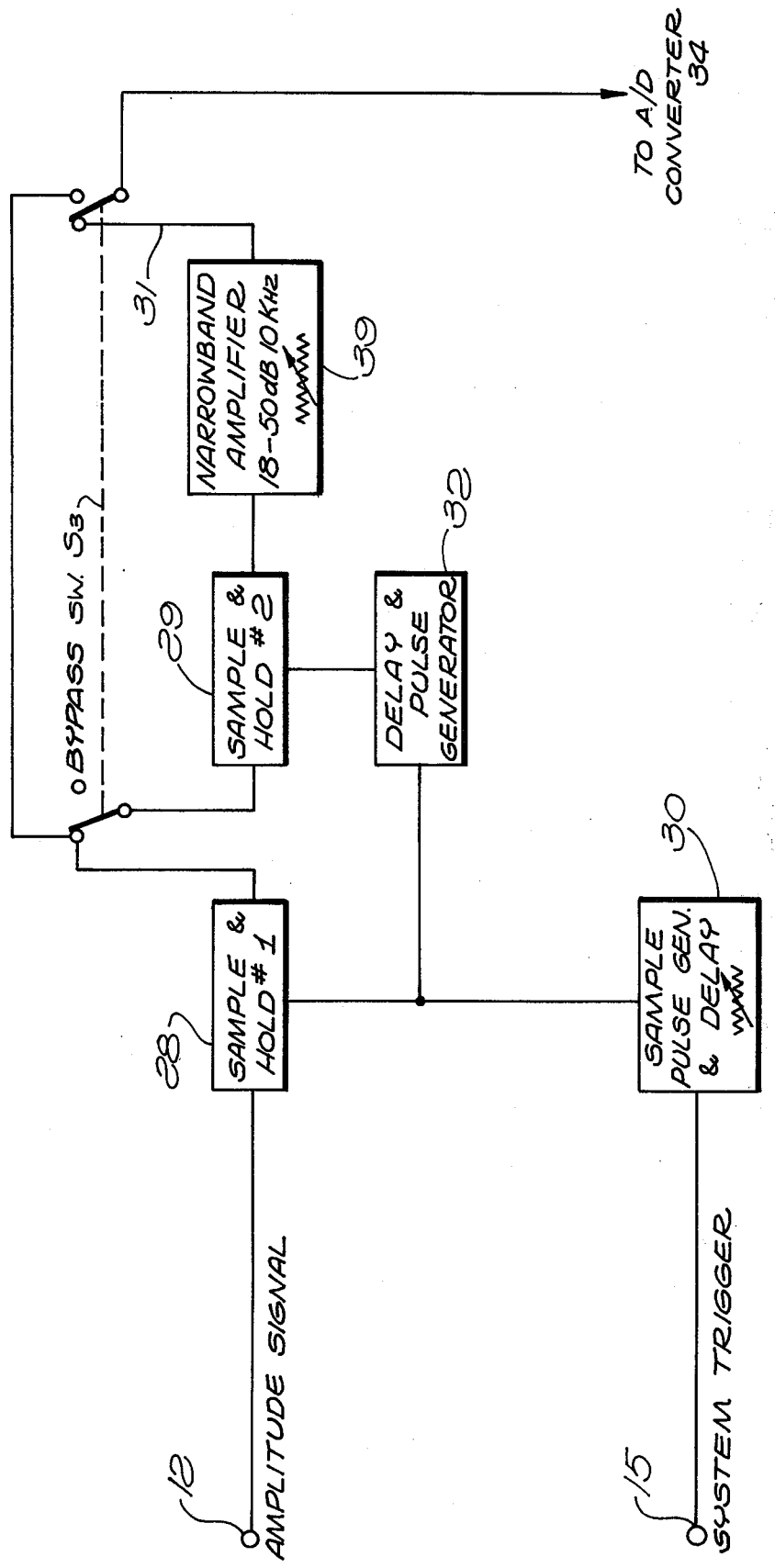
FIG. 3. AMPLITUDE JITTER MEASUREMENT BLOCK DIAGRAM.

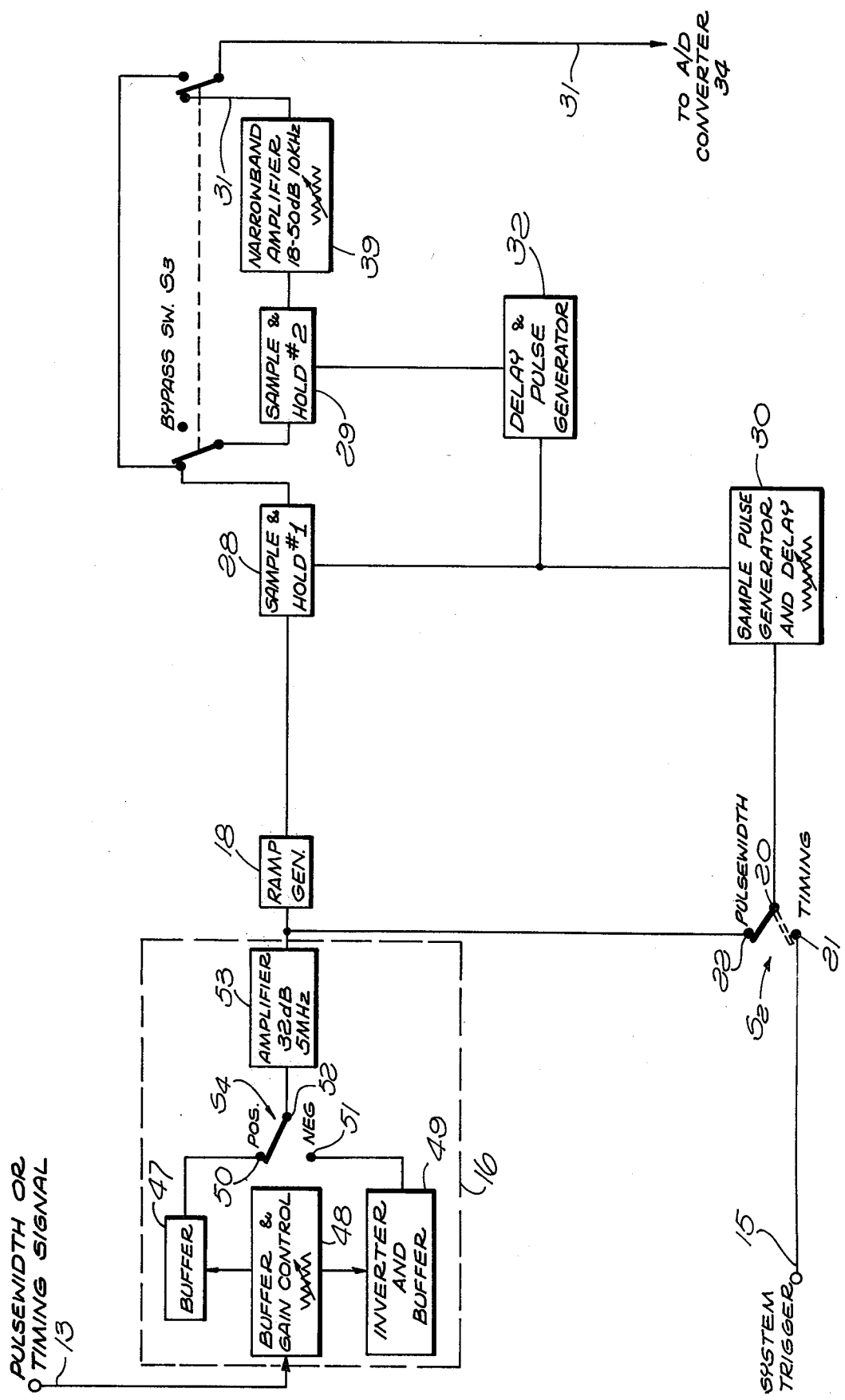
FIG. 4. PULSEWIDTH OR TIMING JITTER MEASUREMENT BLOCK DIAGRAM

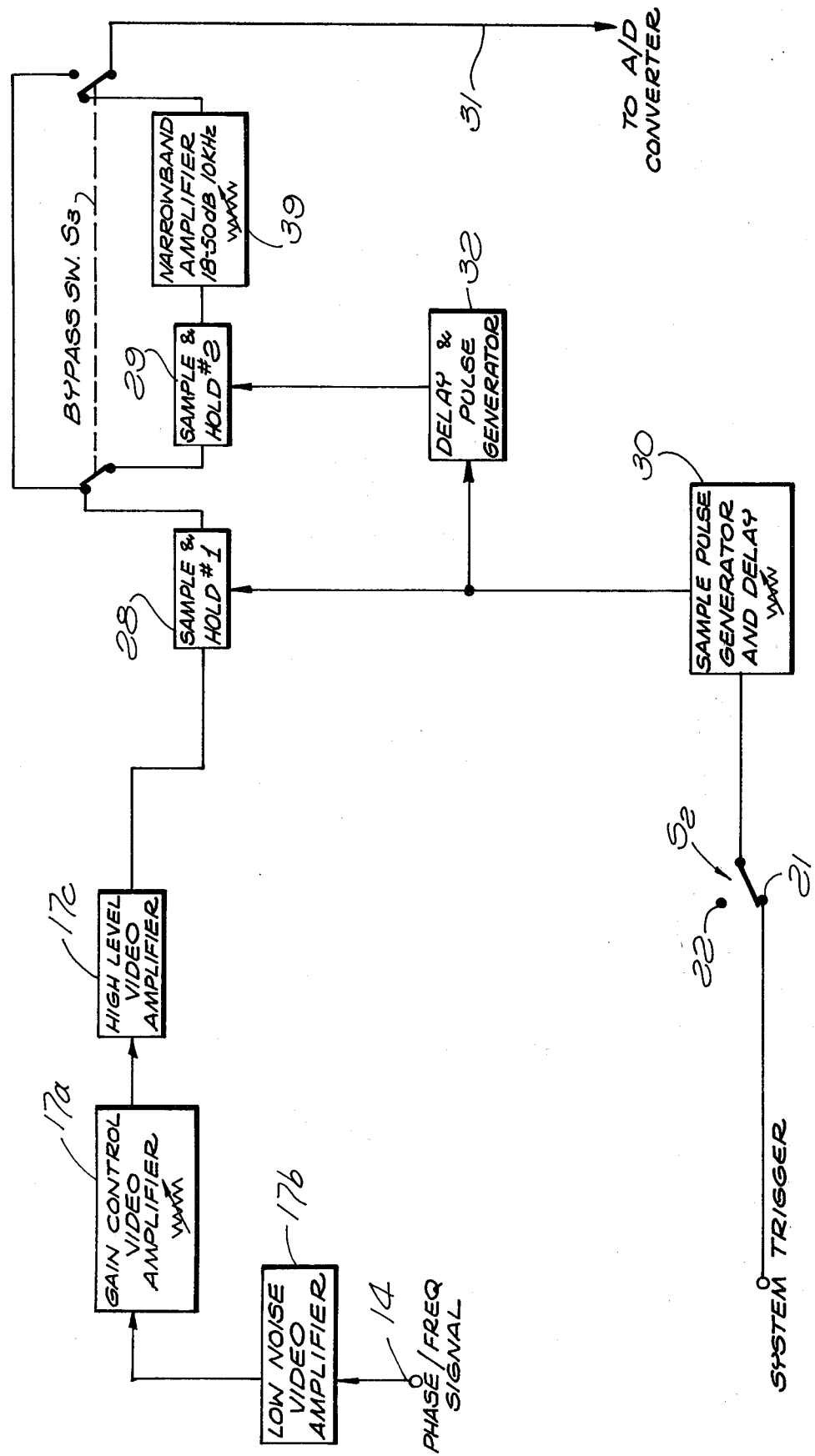
FIG.5. PHASE/FREQUENCY JITTER MEASUREMENT BLOCK DIAGRAM

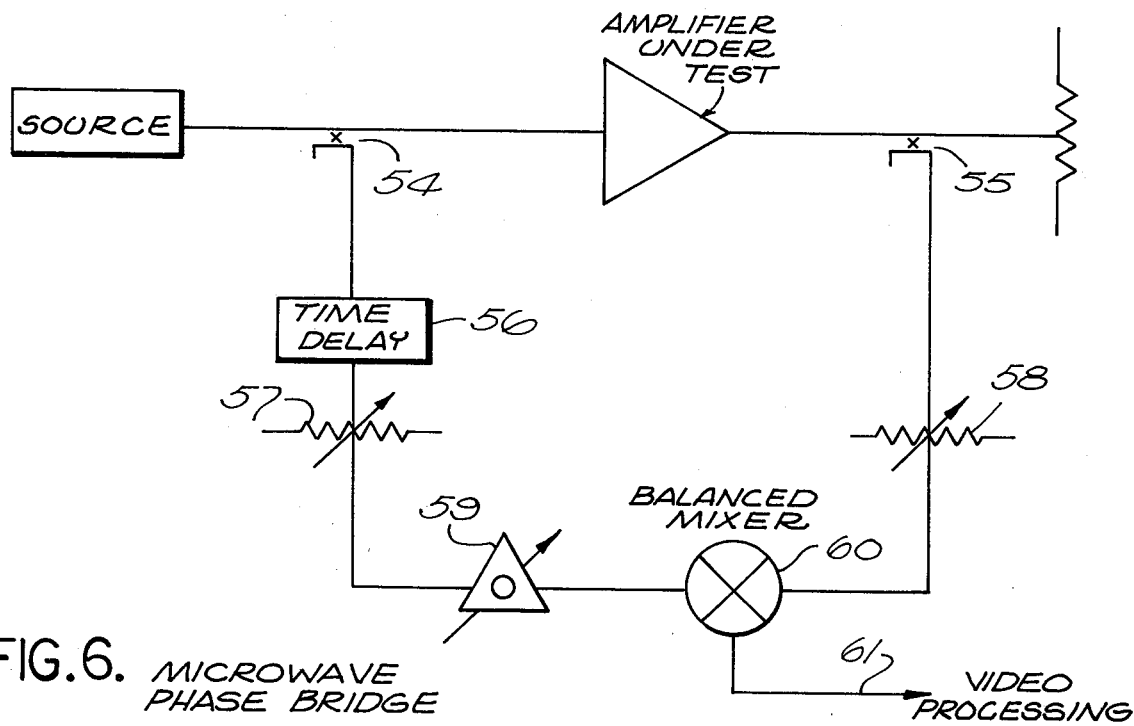
FIG.6. MICROWAVE PHASE BRIDGE
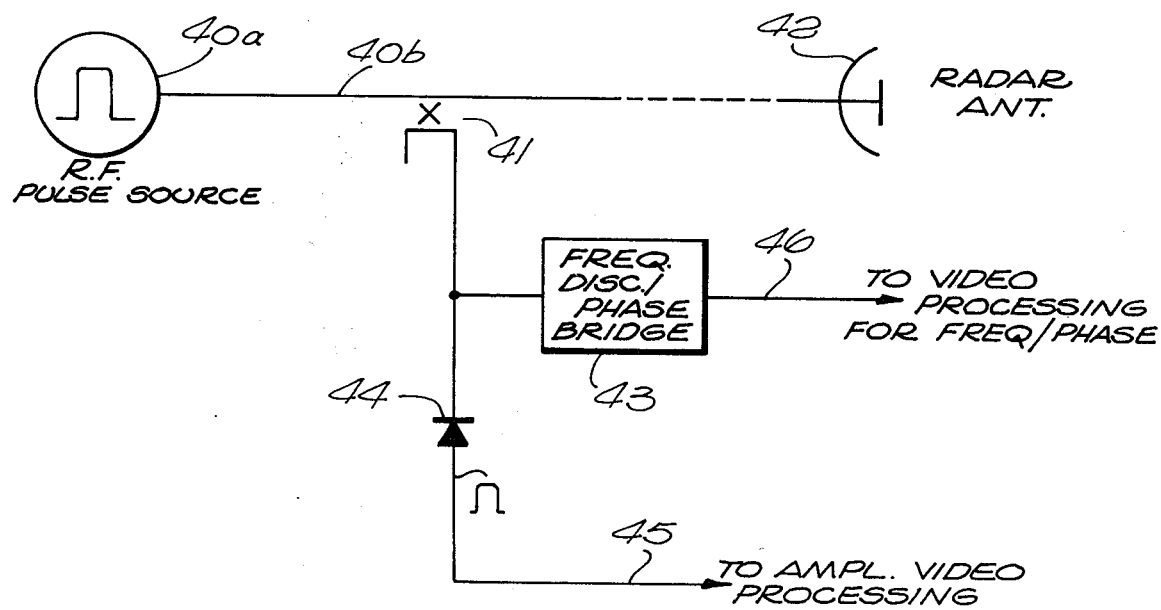
FIG.7. R.F. PULSE TO VIDEO PROCESSING INTERFACE CIRCUIT

SYSTEM FOR MEASURING PULSE INSTABILITIES IN A RADAR SYSTEM OR THE LIKE

BACKGROUND OF THE INVENTION

1. Field of the Invention

The invention relates generally to radar system test equipment and more specifically to equipment for evaluating moving target indicator radar performance as a function of transmitted pulse stability.

2. Description of the Prior Art

MTI Radar performance is frequently specified in terms of Improvement Factor I, which is defined as the ration of output target-to-clutter power to input target-to-clutter power, averaged over all target speeds. This precise definition used as a figure of merit for MTI systems takes into account the average gain of the MTI system and the clutter attenuation properties. The response of an MTI system to clutter relative to average MTI system response to bona fide targets is thereby determined. The value of I obtained by a system is a function of the clutter environment. Modern radar specifications usually include specific clutter models to be used in evaluation of system performance. For example, a high performance search radar might be required to have Improvement Factors on the order of 60 dB against ground clutter and 35 dB against specified rainfall rates. Landing system requirements may specify Improvement Factors on the order of 35 dB against ground clutter.

Instabilities in the radar transmitter, receiver, and processor have the effect of disturbing the phase relationships in a coherent radar or, equivalently, increasing the spectral spread of the clutter. These instabilities thus degrade MTI performance, and specification and control of the stability of various signals in the radar becomes important.

In connection with such systems, much work has been done characterizing the frequency stability parameters of the CW oscillators used in radar systems to provide the local oscillator (STALO or STAMO) and the coherent oscillator (COHO). Several studies have also related these parameters to system performance. Radar textbooks and reference books (for example the text, RADAR HANDBOOK, by Merrill J. Skolnik, McGraw Hill, 1970) relate the various system instabilities to system performance.

The aforementioned investigative work allows measurements to be made at the subsystem level and to be related to system performance. This measurement at subsystem level has obvious advantages in that design parameters can be specified, optimized, and measured for required performance and system performance can be more accurately assessed before final consolidation of the system. In this way, inadequate system performance can be localized to specific problems in subassemblies, which can be upgraded as necessary. While the relationships betwen system performance and subsystem measurements cannot completely substitute for final system evaluation, they can certainly minimize the risk involved in the overall design.

Radar transmitter subsystems may be either of the oscillator (magnetron for example) or MOPA type (ending in a power amplifier state such as an amplitron).

The types of instabilities of transmitting subsystems which contribute to MTI radar performance deterioration, and therefore, require careful evaluation, are of several types. Among the most important of these are timing, pulse width, amplitude, phase and frequency.

The technical literature variously relates system performance in transmitter instabilities in connection with the so-called Improvement Factor hereinbefore mentioned. In the text, "Radar Design Principles" by F. E. Nathanson (Mc-Graw Hill, 1969), Chapter 9, an analysis is given from which the improvement factor can be written as follows:

$$I = \frac{\bar{S}_o}{S_i} CA$$

where
- $CA$ = Clutter attenuation
- $S_i$ = Input signal
- $\bar{S}_o$ = Output signal averaged over all target velocities Investigation of the above relationship for each type of transmitter instability recognized allows development of a set of equations relating measurements of the variance, first difference or pulse-to-pulse variance (single canceller), or second difference variance (double canceller) of each fluctuation, to system Improvement Factor limitations. When the disturbances are substantially uncorrelated, then the Improvement Factor I may be written as a total Improvement Factor from all the uncorrelated disturbances $I_T$, as follows: N being the number of difference causes considered:

$$I_T = \frac{1}{\frac{1}{I_1} + \frac{1}{I_2} + \ldots + \frac{1}{I_N}}.$$

A compilation of Improvement Factor limitations due to the various instabilities in transmitters is given in Table I, assuming that the various disturbing factors are uncorrelated.

TABLE 1

SYSTEM IMPROVEMENT FACTOR LIMITATIONS DUE TO TRANSMITTER INSTABILITIES
IMPROVEMENT FACTOR $(I)_{dB} = 10 \text{ LOG}[\ ]$

| | MEASUREMENT | | |
|---|---|---|---|
| | VARIANCE | FIRST DIFFERENCE VARIANCE | SECOND DIFFERENCE VARIANCE |
| TIMING INSTABILITIES | | | |
| SINGLE CANCELLER | $\frac{\tau^2}{2\sigma_t^2}$ | $\frac{\tau^2}{\sigma_{\Delta t}^2}$ | — |
| DOUBLE CANCELLER | $\frac{\tau^2}{2\sigma_t^2}$ | — | $\frac{3\tau^2}{\sigma_{\Delta^2 t}^2}$ |
| PULSEWIDTH INSTABILITIES | | | |
| SINGLE CANCELLER | $\frac{\tau^2}{\sigma_T^2}$ | $\frac{2\tau^2}{\sigma_{\Delta T}^2}$ | — |
| DOUBLE CANCELLER | $\frac{\tau^2}{\sigma_T^2}$ | — | $\frac{6\tau^2}{\sigma_{\Delta^2 T}^2}$ |
| AMPLITUDE INSTABILITIES | | | |

TABLE 1-continued

SYSTEM IMPROVEMENT FACTOR LIMITATIONS DUE TO
TRANSMITTER INSTABILITIES
IMPROVEMENT FACTOR $(I)_{dB} = 10\ LOG[\ ]$
MEASUREMENT

| | VARIANCE | FIRST DIFFERENCE VARIANCE | SECOND DIFFERENCE VARIANCE |
|---|---|---|---|
| SINGLE CANCELLER | $\dfrac{A^2}{\sigma A^2}$ | $\dfrac{2A^2}{\sigma_{\Delta A}^2}$ | — |
| DOUBLE CANCELLER | $\dfrac{A^2}{\sigma_A^2}$ | — | $\dfrac{6A^2}{\sigma_{\Delta^2 A}^2}$ |
| FREQUENCY INSTABILITIES (OSCILLATORS) | | | |
| SINGLE CANCELLER | $\dfrac{3}{(2\pi\tau)^2\sigma_f^2}$ | $\dfrac{6}{(2\pi\tau)^2\sigma_{\Delta f}^2}$ | — |
| DOUBLE CANCELLER | $\dfrac{3}{(2\pi\tau)^2\sigma_f^2}$ | — | $\dfrac{18}{(2\pi\tau)^2\sigma_{\Delta^2 f}^2}$ |
| PHASE INSTABILITIES (AMPLIFIERS) | | | |
| SINGLE CANCELLER | $\dfrac{1}{\sigma_\phi^2}$ | $\dfrac{2}{\sigma_{\Delta\phi}^2}$ | — |
| DOUBLE CANCELLER | $\dfrac{1}{\sigma_\phi^2}$ | — | $\dfrac{6}{\sigma_{\Delta^2\phi}^2}$ |

WHERE  $\sigma_{(\ )}^2$ = VARIANCE OF INDEPENDENT SAMPLES OF FLUCTUATION
$\sigma_{\Delta(\ )}^2$ = FIRST DIFFERENCE VARIANCE
$\sigma_{\Delta^2(\ )}^2$ = SECOND DIFFERENCE VARIANCE
$\tau$ = PULSEWIDTH
A = AMPLITUDE With the foregoing as background, it will be realized that the analysis of a radar system requires the accurate measurement of the net effects of various transmitter pulse instabilities through the entire signal processing chain of a radar system. In the prior art, efforts have been exerted to measure the instabilities themselves and their effects. A computing counter, such as manufactured by the Hewlett-Packard Company under the designation HP5360, along with associated hardware, has been used to this end. Such a device however, is inherently limited to low pulse repetition rates in a pulse-to-pulse RMS mode.

A need clearly exists for a test set for the specialized MTI performance evaluation problem so that a much wider range of repetition rate accommodation is possible, and for a "net effect" display presented as a function of the instability of each parameter to be evaluated.

The manner in which the device of the present invention provides a device capable of MTI system instability measurement over a broad range of repetition rates (and even for staggered PRF) will be evident as this description proceeds.

SUMMARY OF THE INVENTION

A typical test device constructed according to the invention is capable of measuring over a repetition rate range of about 200 to 10,000 measurements per second. The signal exhibiting the instability can be amplitude measured or used to trigger a ramp which will have the same timing fluctuations. Sampling of the ramp amplitude at a fixed point in time thus converts timing fluctuations to amplitude fluctuations which may be amplified before being processed by digital circuits. Sampling the triggered ramp at a point in time corresponding to the trailing edge of the pulse converts pulse width fluctuations to amplitude fluctuations which are then amplified and processed by digital circuits.

Phase and frequency fluctuation measurements require microwave sensors for converting the microwave signals to video or base-band frequencies for analysis by the test device and suitable devices therefor are described.

Although commercial equipment is available to measure frequency components of the video signal, no equipment is available to calculate RMS values of the fluctuation as is accomplished by the device of the present invention.

The present test set directly reads the RMS variation of the waveform of the selected instability itself. The analog signal conditioning section to which the transmittable pulse in video domain is submitted, converts the particular instability to be measured to an amplitude fluctuation which is thereafter digitized in the digital processing section. The analog conditioning section of the device preceding digitization has the further goal of providing amplification or other signal handling to apply a scale factor to the signal as it is supplied to the digital processing section, thereby utilizing as much as possible of the available dynamic range of the digital equipment.

The digital processing section includes analog-to-digital conversion, and provides alternatively for alternative types of digital video processor as normally encountered in MTI radar systems. These alternates include single, double and triple cancellation, FFT processing, or others. Serial Digital Processing is used because of the saving in hardware offered by that technique, since speed of processing is not considered a problem in the particular application where the maximum PRF would not normally exceed 10 KHz.

After signal processing, which will be explained in more detail hereinafter, digital to analog conversion is effected. Thereafter, a circuit providing a true RMS-to-DC conversion receives the signals and provides an output which may be directly read on an analog meter or other indicating instrument. The displayed output of the entire test device is thus proportional to the RMS value of a cancellor or processing residue.

The manner in which the device of the present invention accomplishes the objective of directly providing the aforementioned true RMS value of the signal processing residue will be understood as this description proceeds.

BRIEF DESCRIPTION OF THE DRAWINGS

FIG. 3 is a schematic block diagram of the analog conditioning section of the device according to the invention in the amplitude "jitter" measurement mode.

FIG. 4 is a schematic block diagram of the analog conditioning section of the device of the present invention in the timing or pulse width "jitter" measurement modes.

FIG. 5 depicts a schematic block diagram of the analog conditioning section of the device of the present invention in the phase/frequency "jitter" measurement modes.

FIG. 6 is a preconditioning circuit showing how an RF amplifier of a microwave transmission subsystem may be individually evaluated and provides a video input for the circuit of FIG. 1.

FIG. 7 is s schematic block diagram of a detector microwave phase bridge/discriminator arrangement used ahead of the analog conditioning section of the device to convert microwave signals to video or baseband domain for handling by the device of the present invention.

DESCRIPTION OF THE PREFERRED EMBODIMENT

Figure 1:
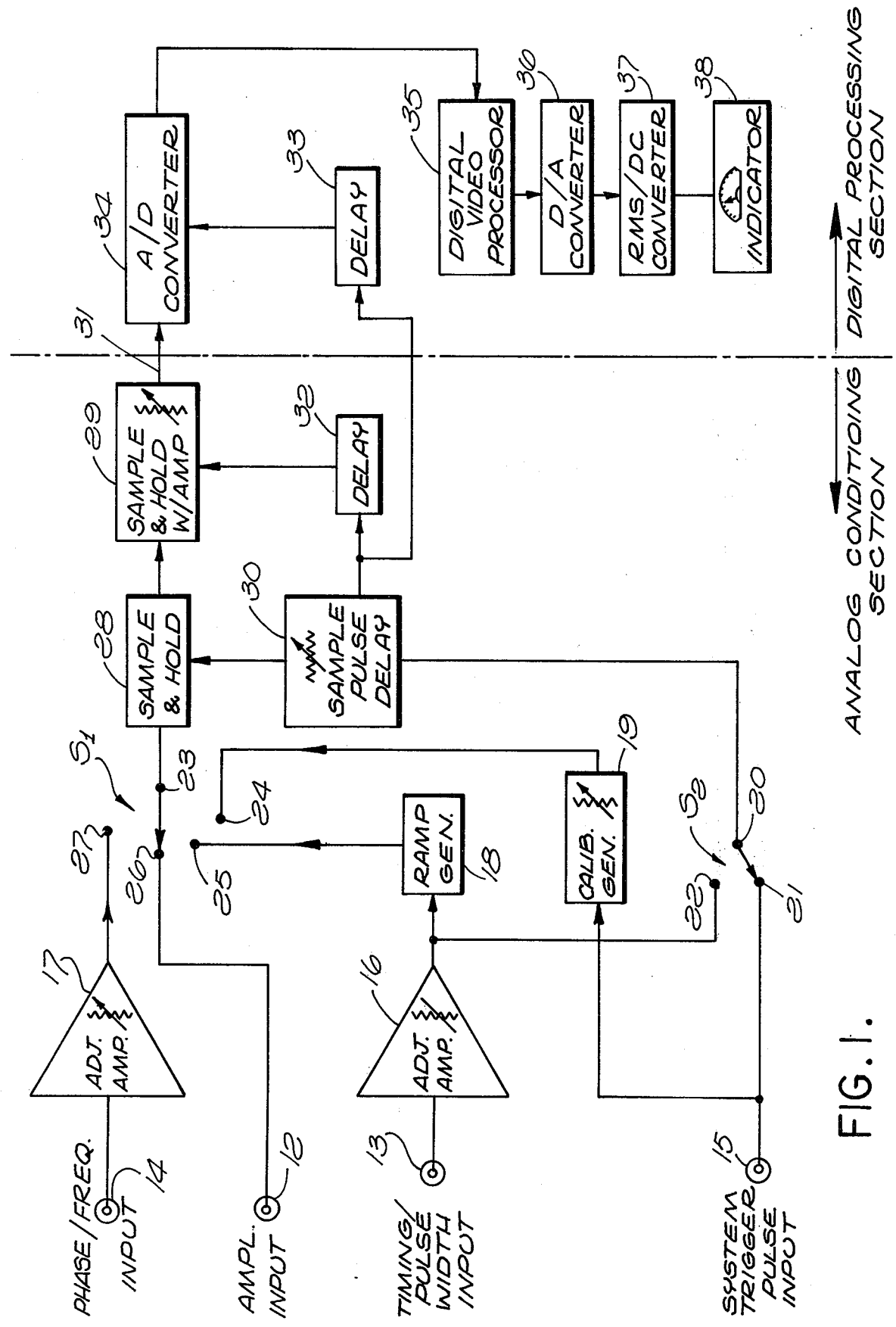
FIG. 1 is a schematic block diagram of the overall test set in accordance with the present invention.

Referring now to FIG. 1, the overall schematic block diagram of the device of the present invention is depicted in somewhat simplified form. An analog conditioning section, generally at 10, for accepting the input signals corresponding to measurement of the various instability parameters is shown. Specifically, terminal 12 is the terminal for measurement of amplitude instability of the transmitter pulse reduced to the video domain. Similarly, terminal 13 is the input terminal for measurement of pulse timing or pulse width jitter. Terminal 14 provides the input for phase and frequency instability measurement. Terminal 15 is the system trigger pulse input, all of the aforementioned inputs being derived from an MTI radar system (or at least the transmitting subsystem thereof) under test.

As this description proceeds, the interface circuits necessary to provide the input pulse signal corresponding to the transmittable RF pulse will be referred to and at this point it is deemed desirable to look ahead to FIG. 7 for a description of these circuits.

In FIG. 7, a pulsed radar transmitting RF pulse source 40a feeds a waveguide transmission line 40b to an antenna 42. A coupler 41 diverts a small amount of the RF pulse energy which is detected (reduced to the video frequency domain) by diode 44, providing a video equivalent of the transmittable RF pulse at 45. Block 43 may be either a frequency discriminator or a phase bridge (selectably) for providing a pulse at 46 representative of the type of instability induced by frequency or phase jitter, respectively.

Returning now to FIG. 1, selector switch S1, having a movable contact 23 and fixed contacts 24, 25, 26 an 27, is arranged to provide an input to a sample and hold circuit 28 from each of the four points, 24 through 27. Thus it will be seen that this switch S1 provides selection of the mode of instability measurement desired at the time.

In the amplitude fluctuation measurement mode S1 connects an amplitude input signal on terminal 12 through terminal 26 of S1 to terminal 23 thereof and thence to the sample and hold circuit 28. The adaptation of an RF transmitter pulse to be inputed into terminal 12 is accomplished through the conventional detector of FIG. 7, from 45 thereof.

At this point it is to be observed that the sample and hold circuit 28, and also the sample and hold circuit included in block 29, are conventional solid state standard modules very well known in this art. Similarly, it is thought unnecessary to describe sample pulse delay means 30 or the individual delay blocks 32 and 33, since these are readily implemented from a range of techniques very well known to those of ordinary skill in this art. Still further, the means for effecting analog-to-digital conversion, such as 34, and the converse, such as 36, are very well known to those of ordinary skill in the digital computer and related arts, and are readily instrumented from ordinary knowledge therein.

It is also pointed out that the RMS-to-DC converter 37 is available in a solid state module form as an ordinary item of commerce. It is a true RMS detector and therefore provides a DC output value readily applied to indicating meters such as 38 to visually indicate a value which is a direct function of the RMS value of the fluctuations extant at the output of the digital-to-analog converter 36.

The calibration generator 19 is a useful part of the overall instrument in accordance with the present invention but is not of itself an essential part of the novel combination. One way of implementing the calibration generator 19 is through a two-to-one countdown of the system trigger pulse at input 15 and generation of a square wave to simulate a signal by "half-timing." In this way the effect of a maximum canceller excursion can be achieved, the said canceller being one of the available forms of digital video processor to be discussed hereinafter for inclusion in block 35. From the known characteristics of the square wave provided from calibrated generator 19, and with S1 switched to the switch point 24, the amplitude of the square wave signal from 19 may be adjusted to some predetermined value on the indicator 38, for example, full scale as indicated thereon. It is also possible through the use of the calibrated generator 19, to "match" a reading obtained on meter 38 in one of the positions of S1 other than the calibrated position, thereby providing an indirect or implicit method of reading the RMS DC value corresponding to a certain known pulse amplitude variation programmed from 19.

It will be seen that lead 31 constitutes the transition from the analog conditioning section to the digital processing section, as illustrated in FIG. 1, and hereafter the various modes of fluctuation measurement possible in the device of the present invention will be described not only in reference to FIG. 1, but also with reference to FIGS. 3, 4 and 5.

As hereinabove stated, the input at terminal 12 is a detected RF transmitter pulse (video) in the arrangement representing the most common use of the present invention. This video pulse is synchronous with, and slightly delayed from, the system trigger pulse extant on terminal 15 as a consequence of the normal functioning of the radar transmitter controlled by the system trigger. With the switch S2 in the position connecting switch terminal 21 to 20, this system trigger controls the sample pulse and delay circuit 30. The delay inherent in 30 by means of a pulse delay circuit of any well known type may be predetermined or controllable to provide a control pulse to effect sampling in the circuit 28 at an optimum time. In general, sufficient delay would be desired so that the sample pulse does not occur too close to the leading edge of the transmittable pulse representing video signal at 23, when making amplitude jitter measurement. In that way the sample value is not influenced by timing or leading edge jitter, if any.

As previously indicated, the sample and hold circuits 28 and 29 are solid state modules of a generally available type. In such circuits it is well known that a tradeoff between acquisition time and "droop" must be made. That is to say, the sample and hold circuit may be made to "learn" the sampled value very quickly, however, in that case it will also tend to "forget" the sample value relatively quickly. By using two sample and hold circuits 28 and 29, the circuit 28 can be selected to acquire the sample value quite rapidly. A second sample and hold circuit 29 activated from the sample pulse delay pulse circuit 30 in accordance with a nominal additional delay provided by delay circuit 32, can acquire the value held by 28 over a longer time after sampling in 28 is complete, but not such a long time that the droop of 28 introduces an appreciable error. Thus, since 29 is controlled to acquire the output value of 28 over a considerably longer sampling pulse, it provides the means for holding this value on lead 31 for a long enough time to allow narrow-band amplification of the signal without saturation before analog to digital conversion.

FIG. 3 illustrates the analog conditioning section with the continuities provided when switches S1 and S2 (FIG. 1) are set for amplitude fluctuation measurement in accordance with the foregoing description. Like components are labeled in like manner on FIG. 3 as compared to FIG. 1, however, it will be noted that FIG. 3 includes a switch S3 which will be seen to merely provide a switchable by-pass whereby the sample and hold 28 output may be provided directly to the A/D converter 34 of FIG. 1 for circuit checking, calibration or other purposes.

FIG. 3 also includes a narrow band amplifier between sample-and-hold circuit 29 (the number 2 sample and hold circuit) and lead 31. This post sampling amplification provided by 39 increases the amplitude fluctuations before digital processing, thereby effecting greater utilization of the dynamic range of the digital processing circuits. Obviously, to preserve the scale factor of the overall instrument, the gain of this amplifier 39 must be predetermined and properly related to the digital processing circuit. That consideration is however, a matter readily implemented by those of ordinary skill in this art.

Considering next the arrangement of the overall instrument for use in measuring pulse timing fluctuations (leading edge jitter) will now be explained.

Again the transmittable pulse reduced to video form is a pulse signal to terminal 13, supplied from 45 of the interface circuit of FIG. 7.

In fact, in both the pulse timing measurement and pulse width measurement modes, the input signal to terminal 13 of FIG. 1 is provided from output 45 of FIG. 7.

An adjustable amplifier 16 receives the timing pulse including whatever leading edge time fluctuation it includes and amplifies it before applying it to ramp generator 18. This is possible since the said leading edge time fluctuations are essentially time varying offsets which are substantially the same at any amplitude along the said leading edge of the pulse (i.e., are not variations in leading edge slope but only in "firing" or beginning times of the various circuits within the equipment being tested). The amplification in 16 facilitates a range of adjustment of triggering level on the input signal but does not affect the measurement of the timing or leading edge jitter but does operate to minimize any incidental errors in the generation of the voltage ramp from 18 by minimizing the ramp initiation time uncertainties. The ramp generator 18 is otherwise known as a sawtooth generator and is not unlike a linear sweep generator. Its construction is very well known to those skilled in this art.

At the output of ramp generator 18 a highly linear sawtooth waveform is produced with a timing jitter which repeats that of the pulse to be evaluated on terminal 13. The switch S1 has its common terminal 23 switched to terminal 25 for this measurement and thus the sawtooth signal output of 18 is applied to the sample and hold 28 and is sampled at a time determined by, but slightly delayed from, the system trigger pulse (reference) input on terminal 15 in the same manner as was accomplished in connection with evaluation of amplitude fluctuations applied at terminal 12. Since the time of sampling in 28 is substantially fixed in time, the actual amplitude point of sampling along the sawtooth slope received from 18, varies with the timing jitter of the said sawtooth signal from 18 and therefore is in accordance with the timing jitter of the signal applied at 13. This variation or fluctuation in sampling point will be seen to effectively convert the signal extant at the input of circuit 28 to an amplitude fluctuation. From thereon, to lead 31, the operation is effectively the same as provided for the measurement of amplitude jitter hereinbefore described.

FIG. 4 depicts those portions of the analog conditioning section of FIG. 1 in somewhat more detail as they would be operative for the timing measurement.

Switch S2 remains in the position illustrated on FIG. 1, i.e., in which moving contact engages fixed contact 21. On FIG. 4, S2 would be in the dotted position of the moving contact corresponding thereto.

On FIG. 4, the adjustable amplifier 16 is further illustrated and will be seen to contain a buffer and gain control 48 having two outputs, one to buffer 47 and the other to inverter and buffer 49. In this way, both polarities of signal input at 13 can be accommodated and switch S4, having movable contact 52, is able to select between fixed contacts 50 and 51 for that purpose. The amplifier 53, having a typical gain of 32dB and a bandwidth of approximately 5MHz, provides the triggering step function required to initiate operation of ramp generator 18 corresponding to each pulse repetition period at the time of occurrence of the pulse to be evaluated on terminal 13. The operation of the remaining circuitry of FIG. 4 is the same as that provided by the corresponding circuits and elements of FIG. 3.

Considering now the pulse width fluctuation measurement mode of the device according to the present invention, it is only necessary that S2 be switched such that its moving contact 20 engages fixed contact 22; the setting of S1 remains as before, i.e., moving contact 23 engaging fixed contact 25. Essentially the only difference in this pulse width instability measuring mode, vis-a-vis, the timing or leading edge jitter measurement mode is in the ramp generator and sampling initiation. With S2 in the position in which the movable contact 20 engages the fixed contact 22, the ramp generator 18 is triggered by the leading edge of the pulse inputted at 13, but the sample pulse generator 30 is triggered from the trailing edge of this terminal 13 pulse, this being handled in block 30. Thus, the sample taken by 28 is that substantially coincident with the trailing edge of the pulse at terminal 13, and the measurement is independent of the leading edge jitter extant on the pulse at the said terminal 13. In this way, only pulse width variations are translated to the amplitude fluctuations which the sample and hold circuit 28 and its associated circuitry are able to evaluate to produce the corresponding fluctuation signal on 31. Here again, post sampling narrow band amplification provided by 39 magnifies the amplitude fluctuations to a level which effectively uses the dynamic range of the digital processing circuits to follow.

Considering now the operation of the device of FIG. 1 for frequency and phase fluctuation measurement, we refer once again to FIG. 7. Here the output 46 provides a processable signal for admission at terminal 14 at FIG. 1. This signal at 46 exhibits an amplitude fluctuation as a result of frequency fluctuations on 40b of FIG. 7 if selection of the frequency discriminator is made within block 43. Similarly, if the phase bridge within 43 is operative, the signal on 46 is an amplitude variation as a function of phase fluctuations on 40b. As hereinbefore indicated, frequency discriminator and phase bridge aspects of block 43 are provided by circuits extremely well known to those skilled in this art and no further explanation thereof is necessary. Correlating FIG. 5 with FIG. 1, it will be noted that amplifier 17 includes not only a gain controlled video amplifier 17a, but may also advantageously include a low noise video amplifier 17b. In a high level video amplifier 17c the output of 17c supplied to sample and hold 28 is thereby magnified so that the amplitude samples are relatively large as a function of phase or frequency fluctuations.

Referring now to FIG. 6, an additional form of microwave phase bridge is illustrated for application of the device of the present invention to the analysis of phase instabilities introduced by a microwave amplifier, i.e., such as an amplitron, klystron, etc. In FIG. 6, two couplers 54 and 55, couple out small amounts of microwave power ahead of and after the amplifier under test. A time delay 56 compensates for the average phase delay introduced by the said amplifier under test, and attenuation adjustment 57 and 58 and variable amplifier 59 provide for adjustment of levels into the balance mixer 60. Obviously, the power levels before and after the amplifier under test differ greatly. An output signal 61 is provided which is suitable for video processing in the circuit of FIG. 1 by introduction of terminal 14. The descriptions of FIG. 1 and FIG. 5 apply in the phase/frequency fluctuation determining modes.

In the case of phase and frequency measurement, the discriminator and phase bridge circuits are such as to provide a center value essentially at the average phase or frequency. Fluctuations are therefore determined about this center point.

The technical literature contains detailed information and theoretical discussions relating measured fluctuations, in the various modes determinable in accordance with the foregoing description, to MTI system performance.

In reviewing the mechanisms for analog conditioning in the various modes of measurement of which the device of the invention is capable, it will be realized that, basically, the analog conditioning always operates to convert each converted parameter fluctuation to lead 31, and the digital processing applied to this signal on lead 31 may now be described with reference to FIG. 2.

Since the processing time constraints are not unusually difficult, a relatively simple serial processing scheme may be used.

Figure 2:
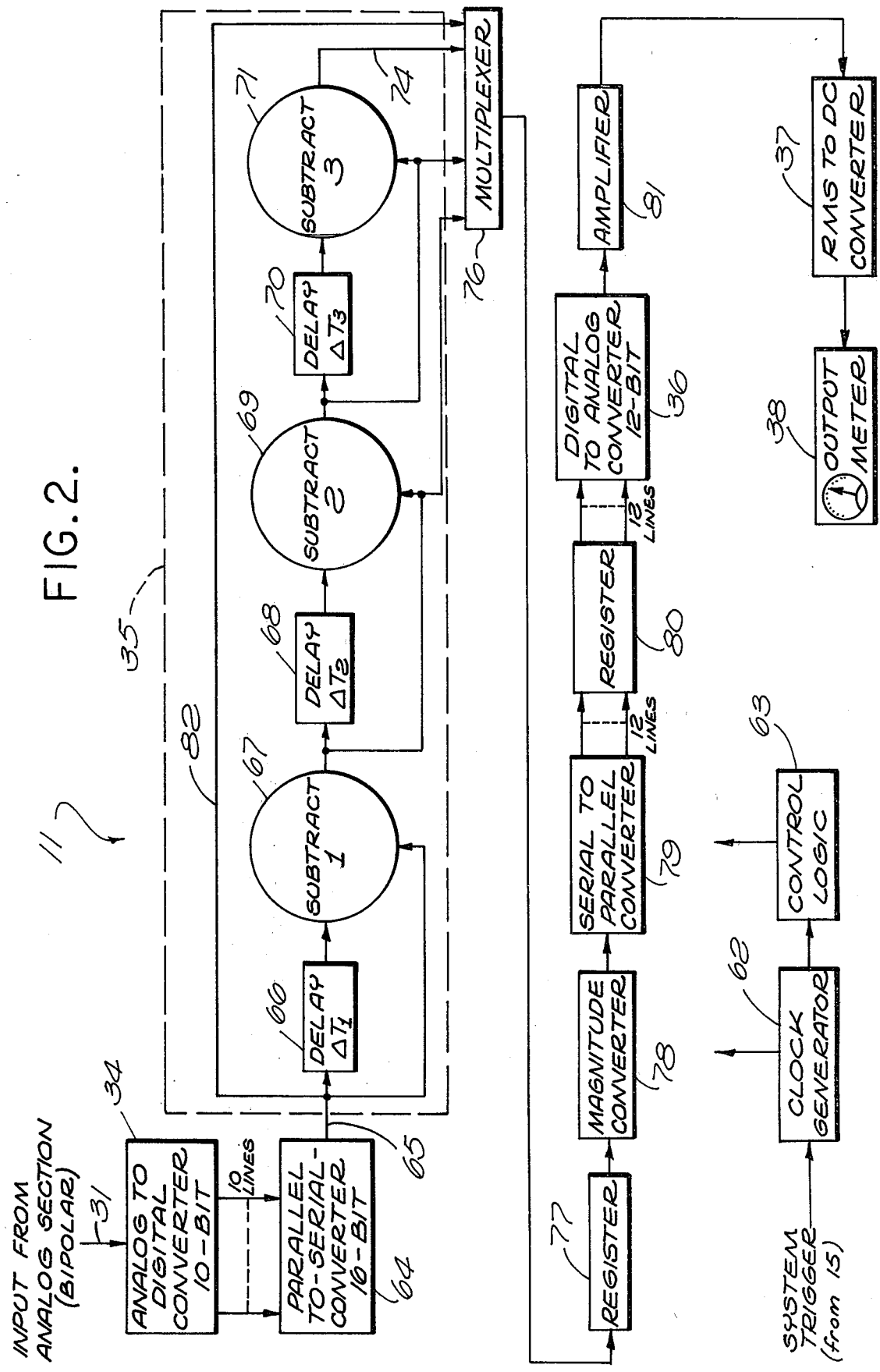
FIG. 2 is a schematic block diagram of the digital processor and output display portion of FIG. 1.

Before proceeding further with the description of FIG. 2, which is actually a multiple digital canceller of the type which will be recognized by those familiar with digital MTI equipment, it should be realized that other types of digital video processors (for 35 of FIG. 1) may be employed. For just one example, the so-called FFT (fast Fourier transform) MTI signal processor may be employed. Essentially, the digital processing section of FIG. 1, which is now to be described in more detail, will be recognized by those skilled in this art as well known digital MTI circuitry and is included to show one form of processing facilitating evaluation in terms of the overall system effect of the various instabilities individually considered.

The circuit illustrated in FIG. 2 comprises those components to the right of the dashed line of FIG. 1, that is, the digital processing section. The instrumentation illustrated in FIG. 2 is one form of the digital processing which may be applied in FIG. 1 in block 35. FIG. 2 also includes a recapitulation of blocks 36, 37 and 38 from FIG. 1.

On FIG. 2, a clock generator 62 and associated control logic 63, are shown operative from the system trigger based on the aforementioned requirement of only one digital word per repetition period of the radar system, (i.e., per sampling), those skilled in the digital computer arts can readily instrument block 62 and 63 from this and the word bit considerations, the order of processing evident, and the knowledge available as to the implementation of digital MTI cancellers in general.

As hereinbefore indicated, the fluctuations on lead 31 are always amplitude fluctuations irrespective of the chosen mode of operation of the analog conditioning section. An analog-to-digital converter 34 (also illustrated in FIG. 1) is keyed to operate at the time the sample from circuit 29 is available, through the delay circuits illustrated in FIG. 1 and hereinbefore described. The output of A/D converter 34 is fed to the digital video processor, which, in the example instrumentation of FIG. 2, is a triple (four pulse) canceller.

As hereinbefore indicated, because only one digital word per pulse repetition period of the device (radar transmitter, for example) is generated and therefor the time constraints encountered are not limiting. The parallel code output of A/D converter 34 provides successive encodings of amplitude of the signals on 31, and in FIG. 2 it will be seen that this output code of 34 is converted to a serial digital code in 64. This serial code is economically handled by relatively simple canceller circuitry. The canceller 34, as illustrated in FIG. 2 comprises the three canceller sections, the first comprising the delay 66 and subtractor 67, the second comprising delay 68 and subtracting circuit 69 and the third including delay 70 with subtraction circuit 71. In each case, the delay is such as to effect subtraction of the input serial code from a time adjacent code, that is, the code provided for the previous pulse repetion interval. Delays 66, 68 and 70 are ordinarily shift register delay lines in this type of instrumentation. It will be seen from FIG. 2 that the canceller 34 is connected so as to provide essentially four outputs, there being also an input 65. The outputs are supplied to a multiplexer or selector 76, which has an output 75 chosen from among lead 74, representing the full four-pulse cancellation capability of the triple canceller, lead 73 representing three-pulse cancellation, lead 72 representing two-pulse cancellation and lead 82 which constitutes a complete by-pass of the canceller to connect lead 65 directly to multiplexer/selector 76. This selection in 76 is an operator option and permits the evaluation of the various stability parameters under various types of MTI cancellation. The previously mentioned alternative processors, such as the FFT, could be switched in alternatively in addition to the canceller described, if desired.

The multiplexer output 75 is clocked into a holding register 77 from which it can be scaled, converted to unipolar data or gain adjusted by canceller order and used as bipolar data. This gain adjustment would ordinarily be made such that the maximum signal possible from the correlated internal calibration signal (see FIG. 1) is set equal to the maximum possible signal out of the digital-to-analog converter 34. For example, the gain through the single canceller is divided by two, this adjustment is necessary to take advantage of the full dynamic range of the processor in each mode, and would be effected in block 78 simply by gain or attenuation determination in a well known manner.

After serial-to-parallel conversion in 79, the data is held in register 80 to afford time between successive new data code words for digital-to-analog conversion 36. After amplification in 81 (suitably selected to be consistent with scale factor) the RMS-to-DC converter 37 previously described, produces a true RMS analog signal representative of the fluctuation measured in the chosen mode and displays this on an output meter 38. This meter 38 may be nothing more than a voltmeter of a well known type.

From an understanding of the instrumentation described, those skilled in this art will understand the inventive concepts involved. Quite obviously, various modifications in the circuitry described can be made within the spirit and concepts of the invention. Accordingly, it is not intended that the drawings and this description should be considered as limiting the scope of the invention, these being illustrative and typical only.

What is claimed is:

1. A test device for generating an electrical quantity selectively representative of the fluctuations in at least one of the amplitude, timing, pulsewidth, phase and frequency parameters of the transmittable RF pulse in a pulsed MTI radar system, said device being responsive to the system trigger pulse of said radar and to a signal corresponding to transmittable pulse, comprising:
   first means for converting said selected one of said parameters to a first electrical signal having an amplitude fluctuation corresponding to the fluctuation in the value of said parameter selected;
   second means within said first means for sampling said first electrical signal at a predetermined time during each repetition period of said radar system;
   third means responsive to the output of said second means for producing a residue signal which continuously represents substantially only the successive amplitude variations of the ouput of said second means from one repetition interval to the next successive repetition interval;
   and fourth means responsive to the output of said third means for generating an electrical output signal as a predetermined function of said residue signal.

2. Apparatus according to claim 1 in which said third means includes at least a two pulse MTI canceller.

3. Apparatus according to claim 1 in which said fourth means includes means for generating said electrical output signal as a function of the RMS value of said residue signal, and in which fifth means responsive to said fourth means are included for direct reading of said RMS value.

4. Apparatus according to claim 1 in which said third means includes signal processing means operative over at least two adjacent pulse repetition intervals, said signal processing means being one of the types including two, three and four pulse MTI cancellers and FFT processors.

5. Apparatus according to claim 4 including analog-to-digital conversion means for digitizing the output of said second means, said signal processing means within said third means being a digitally implemented circuit responsive to the output of said analog-to-digital conversion means, and further including digital-to-analog conversion means responsive to the output of said third means, said last named means providing signal to said fourth means.

6. Apparatus according to claim 5 in which said means for sampling includes means for generating a sampling pulse which is narrow in time compared to said transmittable pulse and is positioned at a predetermined time within the duration of said transmittable pulse for sampling the instantaneous amplitude of said pulse, said test device thereby operating to evaluate the amplitude fluctuations of said transmittable pulse.

7. Apparatus according to claim 5 in which phase bridge means are included between said first means and a source of said RF pulses for generating said signals corresponding to said transmittable pulse, said test device thereby operating to evaluate RF phase fluctuations.

8. Apparatus according to claim 5 in which a frequency discriminator circuit is included between said first means and a source of said RF pulses for providing said signals corresponding to said transmittable pulse, said test device thereby operating to evaluate RF frequency fluctuations.

9. Apparatus according to claim 5 in which said second means includes a ramp generator and a circuit for providing initiation of the ramp thus generated beginning substantially at the leading edge of said signal corresponding to said transmittable pulse, and in which said means for sampling includes means timed from said system trigger for generating a relatively narrow sampling pulse and for applying said sampling pulse to sample the amplitude of said ramp at a predetermined point in time with respect to said system trigger, the sampled value thereby determined being a function of the fluctuation of the timing of initiation of said transmittable pulse with respect to said system trigger.

10. Apparatus according to claim 5 in which said second means includes a ramp generator and a circuit for providing initiation of the ramp generated by said generator substantially at the leading edge of said transmittable pulse, and in which said means for sampling includes means for generating a relatively narrow sampling pulse and for applying said sampling pulse to sample the amplitude of said ramp at a point in time substantially coincident with the trailing edge of said transmittable pulse, thereby to provide ramp amplitude samples varying in accordance with fluctuations in the width of said transmittable pulse, substantially independently of leading edge time fluctuations.

* * * * *